US008140372B2

(12) United States Patent
Chang et al.

(10) Patent No.: US 8,140,372 B2
(45) Date of Patent: Mar. 20, 2012

(54) PLANNING PRODUCTION FOR COMPLEMENTARY DEMANDS

(75) Inventors: Chih-Hui Chang, South Burlington, VT (US); Brian T. Denton, Rochester, MN (US); Sanjay R. Hegde, South Burlington, VT (US); Robert J. Milne, Jericho, VT (US); Stuart H. Smith, Essex Junction, VT (US); Chi-Tai Wang, St. Albans, VT (US); Jacqueline N. Ward, South Hero, VT (US)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 11/462,111

(22) Filed: Aug. 3, 2006

(65) Prior Publication Data

US 2008/0033586 A1 Feb. 7, 2008

(51) Int. Cl.
*G06F 17/50* (2006.01)
(52) U.S. Cl. ..................................... 705/7.25
(58) Field of Classification Search ............... 705/8, 10, 705/22, 28, 7.25
See application file for complete search history.

(56) References Cited

U.S. PATENT DOCUMENTS

| 5,943,484 | A | | 8/1999 | Milne et al. | |
|---|---|---|---|---|---|
| 5,971,585 | A | * | 10/1999 | Dangat et al. | 700/102 |
| 6,188,989 | B1 | * | 2/2001 | Kennedy | 705/8 |
| 6,415,195 | B1 | * | 7/2002 | Gleditsch et al. | 700/99 |
| 6,701,201 | B2 | | 3/2004 | Hegde et al. | |
| 6,731,999 | B1 | | 5/2004 | Yang et al. | |
| 6,895,384 | B1 | * | 5/2005 | Dalal | 705/8 |
| 6,983,189 | B2 | | 1/2006 | Lu | |
| 7,003,365 | B1 | * | 2/2006 | Yen et al. | 700/99 |
| 7,257,552 | B1 | * | 8/2007 | Franco | 705/28 |
| 2001/0004520 | A1 | | 6/2001 | Nomoto et al. | |
| 2002/0143669 | A1 | * | 10/2002 | Scheer | 705/28 |
| 2002/0188499 | A1 | * | 12/2002 | Jenkins et al. | 705/10 |
| 2004/0068430 | A1 | * | 4/2004 | Peachey-Kountz et al. | 705/10 |
| 2004/0093286 | A1 | * | 5/2004 | Cooper et al. | 705/28 |
| 2004/0153187 | A1 | * | 8/2004 | Knight et al. | 700/99 |
| 2005/0086303 | A1 | * | 4/2005 | Ye et al. | 709/205 |
| 2005/0097011 | A1 | * | 5/2005 | Jain et al. | 705/28 |
| 2005/0171625 | A1 | | 8/2005 | Denton et al. | |
| 2005/0171828 | A1 | | 8/2005 | Denton et al. | |
| 2005/0177465 | A1 | | 8/2005 | Orzell et al. | |
| 2005/0234579 | A1 | | 10/2005 | Asmundsson et al. | |
| 2007/0050069 | A1 | * | 3/2007 | Treichler et al. | 700/99 |
| 2007/0124009 | A1 | * | 5/2007 | Bradley et al. | 700/99 |

OTHER PUBLICATIONS

Denton, Brian, et al. "Methods for Solving a Mixed Integer Program for Semiconductor Supply Chain Optimization at IBM." Aug. 2005.*
Shi, Leyuan, et al. "Large-Scale Supply Chain Optimization via Nested Partitions." University of Wisconsin-Madison, Oct. 15, 2002.*

* cited by examiner

*Primary Examiner* — Susanna M Meinecke Diaz
(74) *Attorney, Agent, or Firm* — Richard M. Kotulak; Hoffman Warnick LLC (57) ABSTRACT

Method, system and program product for planning production for complementary demands are disclosed. In one embodiment, a method includes obtaining complementary demand values including at least one daily going rate (DGR) demand and a service demand; running a first planning production model in which the at least one DGR demand is included and the service demand is excluded; and running a second planning production model in which DGR related variables are fixed to values determined in the first planning production model and the service demand is included. Demands that are only considered by one of the planning production models are considered complementary demands.

11 Claims, 4 Drawing Sheets

PLANNING PRODUCTION FOR COMPLEMENTARY DEMANDS

BACKGROUND OF THE INVENTION

1. Technical Field

The invention relates generally to semiconductor manufacturing, and more particularly, to a method, system and program product for planning production for complementary demands.

2. Background Art

One problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (e.g., typically on the order of thousands in semiconductor manufacturing). Such advance planning depends upon the availability of finite resources which include: finished goods inventory, work in process (WIP) inventory at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming or other advanced planning and scheduling methods.

A conventional production planning linear program "LP" is shown below. (U.S. Pat. No. 5,971,585 describes an LP also). This LP makes decisions including: production starts, material substitutions, and shipments planned to customers, between manufacturing and distribution locations, and from vendor suppliers. An LP is composed of an objective function that defines a measure of the quality of a given solution, and a set of linear constraints. The types of equations used in production planning models are well known to those practiced in the art and include:

(1) Material Balance Constraints, which ensure conservation of material flow through the network of stocking points comprising the supply chain.

(2) Capacity Constraints, which ensure that the capacity available for manufacturing activities is not exceeded.

(3) Backorder Conservation Constraints, which balance the quantity of a given part backordered in a given planning period with the quantity backordered in the previous planning period and the net of new demand and new shipments.

(4) Sourcing Constraints, which define target ranges (minimum and maximum) of shipments that should be made from a particular manufacturing or vendor location in the supply chain.

A conventional LP formulation is provided below, i.e., definition of subscripts, definition of objective function coefficients, definition of constants, definition of decision variables, and LP formulation or equations.

Definition of Subscripts:
j: time period
m: material (part number)
a: plant location within the enterprise
n: material being substituted
z: group (which represents a family or collection of part numbers)
e: process (a method of purchasing or manufacturing a material at a plant)
v: receiving plant location
k: demand center (i.e., customer location) (Note: the set of customer locations is mutually exclusive from the set of plant locations)
q: demand class which indicates relative priority
w: resource capacity which could be a machine, labor hour, or other constraint
u: represents a consumer location which refers to an internal plant, external demand center, or to a generic indicator meaning any plant/or demand center Definition of Objective Function Coefficients:
$PRC_{jmae}$: cost of releasing one piece of part m during period j at plant a using process e
$SUBC_{jmna}$: substitution cost per piece of part number n which is being substituted by part number m during period j at plant a
$TC_{jmav}$: transportation cost per piece of part number m leaving plant a during period j which are destined for plant v
$INVC_{jma}$: inventory cost of holding one piece of part number m at the end of period j at a particular plant a
$DMAXC_{jzau}$: cost per piece of exceeding the maximum amount of shipments of group z parts from plant a to consuming location(s) u during period j
$DMINC_{jzau}$: cost per piece of falling short of the minimum amount of shipments specified for group z parts from plant a to consuming location(s) u during period j
$BOC_{jmkq}$: backorder cost of one piece of part m at the end of period j for class q demand at customer location k Definition of Constants:
$DEMAND_{jmkq}$: demand requested during time period j for part number m at customer location k for demand class q
$RECEIPT_{jma}$: quantity of projected wip and purchase order receipts for part number m expected to be received at plant a during time period j
$CAPACITY_{jaw}$: capacity of resource w available at plant a during period j to support production starts
$CAPREQ_{jmaew}$: capacity of resource w required for part number m at plant a for process e during period j
$QTYPER_{jmaen}$: quantity of component m needed per part number n during period j at plant a using process e
$YIELD_{jmae}$: output of part number m per piece released or started at plant a during time period j using process e
$SUBQTY_{jmna}$: quantity of part number m required to substitute for one piece of part number n at plant a during time period j
$MAXPCT_{jzau}$: maximum percentage of total shipments of group z (collection of parts) leaving supplier a during period j to support consumption at consuming location(s) u
$MINPCT_{jzau}$: minimum percentage of total shipments of group z (collection of parts) leaving supplier a during period j to support consumption at consuming location(s) u
$CT_{jmae}$: cycle time. The number of periods between the release and completion of part m jobs for releases made using process e at plant a during time period j
$TT_{mav}$: transport time for part number m from plant a to plant v Definition of LP Decision Variables:
$I_{jma}$: inventory at the end of period j for part number m at a particular plant a
$P_{jmae}$: production starts of part m during period j at plant a using process e
$L_{jmna}$: quantity of part number n which is being substituted by part number m during period j at plant a
$T_{jmav}$: internal shipments of part number m leaving plant a during period j which are destined for plant v $F_{jmakq}$: shipments of part number m leaving plant a during period j and satisfying class q demand at external customer k $B_{jmkq}$: back orders of part m at the end of period j for class q demand at customer location k $H_{jzu}$: total shipments of group z (z is a "collection" of parts) leaving suppliers during period j to support consumption at consuming location(s) u $S_{jzau}$: amount by which total shipments of parts in z from plant a to consuming location(s) u during period j exceeds the maximum amount specified as desired in the sourcing rules $G_{jzau}$: amount by which total shipments of group z parts from plant a to consuming location(s) u during period j falls short of the minimum amount specified as desired in the sourcing rules LP Equations or Formulation:

The following minimizes the objective function subject to the constraints shown below.

Objective Function:

Minimize:

$$\sum_j \sum_m \sum_a \sum_e PRC_{jmae} P_{jmae} +$$

$$\sum_j \sum_m \sum_n \sum_a SUBC_{jmna} L_{jmna} + \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + \sum_j \sum_m \sum_k \sum_q BOC_{jmkq} B_{jmkq}$$

Subject to:

a) Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) - G_{jzau} \leq MINPCT_{jzau} H_{jzu}$$

b) Capacity Constraints:

$$\sum_m \sum_e CAPREQ_{jmaew} P_{jmae} \leq CAPACITY_{jaw}$$

c) Backorder Constraints:

$$B_{jmkq} = B_{(j-1)mkq} + DEMAND_{jmkq} - \sum_a F_{jmakq}$$

d) Material Balance Constraints:

$$I_{jma} = I_{(j-1)ma} + RECEIPT_{jma} + \sum_{\substack{x...s...t \\ x+CT_{xmae}=j}} \sum_e YIELD_{xmae} * P_{xmae} +$$

$$\sum_n L_{jmna} + \sum_{\substack{x,s,t \\ x+TT_{mav}=j}} \sum_v T_{xmva} - \sum_n SUBQTY_{jmna} * L_{jmna} -$$

$$\sum_v T_{jmav} - \sum_k \sum_q F_{jmakq} - \sum_{\substack{n \, st.m \\ is \, a \, component \\ of \, n}} \sum_e QTYPER_{jmaen} P_{jnae}$$

e) Non-Negativity Constraints:

All $X_{i,j\ldots} \geq 0$, where X is a generic decision variable and i, j, etc. represent generic subscripts.

Figure 1:
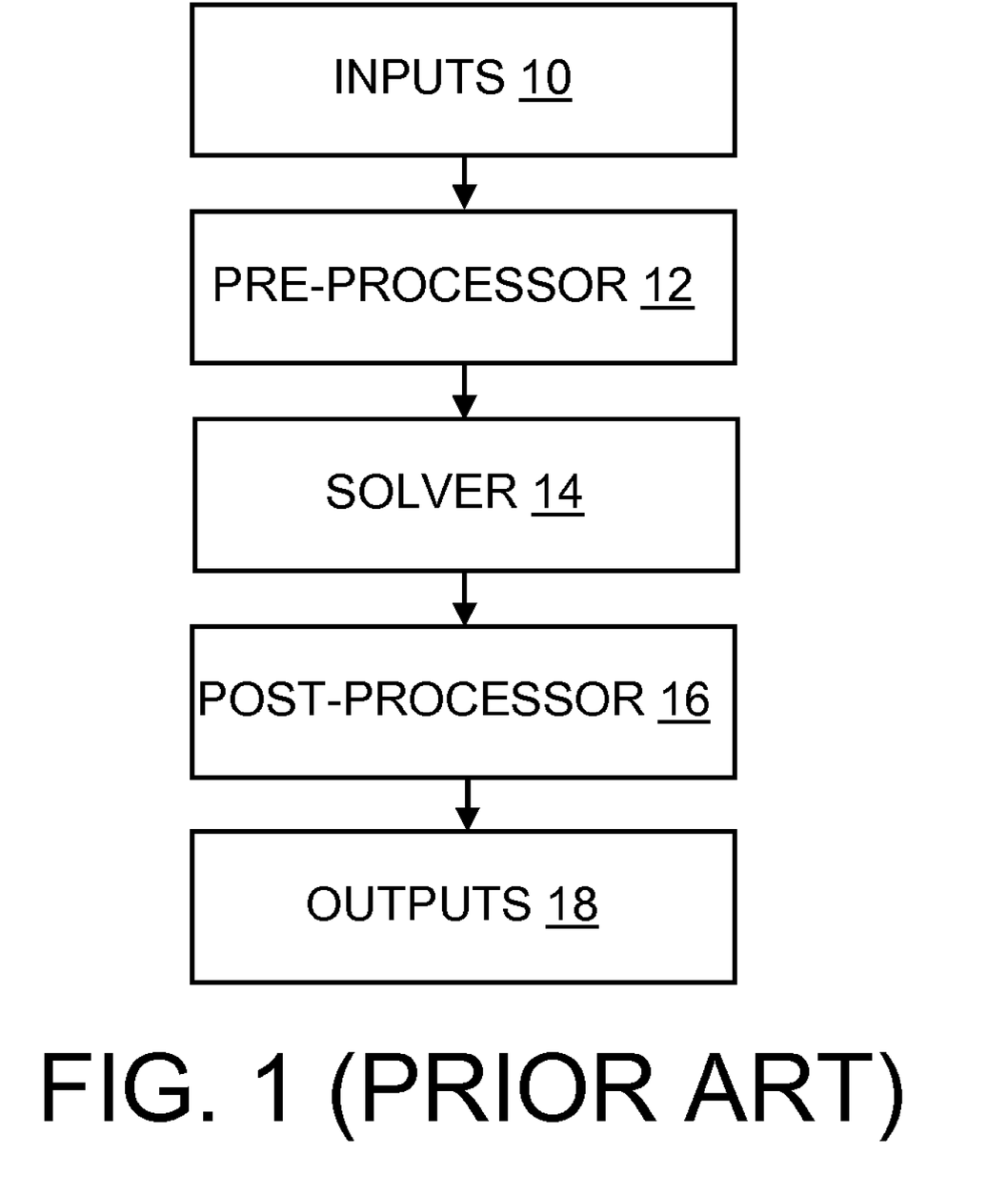
FIG. 1 shows an overview of the structure of a typical linear programming application.

Referring to FIG. 1, linear programming applications typically include the transformation of input files (inputs) 10 into output files (outputs) 18 through a pre-processor 12, a solver 14, and a post-processor 16. Pre-processor 12 transforms the raw input files 10 into a form useable by the linear programming solver 14. Solver 14 determines an optimal raw output solution, which is transformed by post-processor 16 into a format acceptable for usage.

One problem with conventional linear programming applications and other advanced planning and scheduling (APS) methods is that they do not handle complementary demands. That is, demands that collaboratively influence the production of elements of a supply chain wherein no single (complementary) demand directly influences production of an entire chain.

SUMMARY OF THE INVENTION

Method, system and program product for planning production for complementary demands are disclosed. In one embodiment, a method includes obtaining complementary demand values including at least one daily going rate (DGR) demand and a service demand; running a first planning production model in which the at least one DGR demand is included and the service demand is excluded; and running a second planning production model in which DGR related variables are fixed to values determined in the first planning production model and the service demand is included. Demands that are only considered by one of the planning production models are considered complementary demands.

A first aspect of the invention provides a method of planning production, the method comprising: obtaining complementary demand values including at least one daily going rate (DGR) demand and a service demand; running a first planning production model in which the at least one DGR demand is included and the service demand is excluded; and running a second planning production model in which at least one DGR related variable is fixed to values determined in the first planning production model and the service demand is included.

A second aspect of the invention provides a system for planning production, the system comprising: a pre-processor for obtaining complementary demand values including at least one daily going rate (DGR) demand and a service demand; and a solver for: a) running a first planning production model in which the at least one DGR demand is included and the service demand is excluded; and b) running a second planning production model in which at least one DGR related variable is fixed to at least one value determined in the first planning production model and the service demand is included.

A third aspect of the invention provides a program product stored on a computer-readable storage medium, which when executed, plans production, the program product comprising: program code for obtaining complementary demand values including at least one daily going rate (DGR) demand and a service demand; program code for running a first planning production model in which the at least one DGR demand is included and the service demand is excluded; and program code for running a second planning production model in which at least one DGR related variable is fixed to at least one value determined in the first planning production model and the service demand is included.

A fourth aspect of the invention provides a computer-readable medium that includes computer program code to enable a computer infrastructure to plan production for complementary demands, the computer-readable medium comprising computer program code for performing the method of the invention.

A fifth aspect of the invention provides a business method for planning production for complementary demands, the business method comprising managing a computer infrastructure that performs the invention; and receiving payment based on the managing step.

A sixth aspect of the invention provides a method of generating a system for planning production for complementary demands, the method comprising: obtaining a computer infrastructure; and deploying means for performing the invention to the computer infrastructure.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

I. Overview

Method, system and program product are disclosed for planning production for complementary demands. Productions starts, interplant shipments, substitutions, and inventory levels in the presence of complementary demands may be planned employing the present invention. As used herein, "complementary demands" are demands that are considered by only one of two different planning production model runs, and occur in a production facility where the customer expresses demand in complementary forms. In one example, complementary demands may include a daily going rate (DGR) demand and service demand. "DGR demand" is an inventory that must be on hand at any one point in time, e.g., shippable inventory. Hence, DGR demand is time dependent. In the semiconductor foundry industry, for example, legally binding contracts may require a supplier to make a DGR level of finished wafers available for consumption. Although DGR demand can be expressed in terms of pieces per day, those skilled in the art will recognize that it is straightforward to convert pieces per day into pieces in a time period and in fact that the invention applies equally well if the pieces per time period are given as input rather than as pieces per day. DGR demand may include "DGR exit demand," which includes a part of the DGR demand that must be able to leave a production facility at any one point in time, and "DGR reserve demand," which includes a part of DGR demand that must be held in inventory in a production facility at any one point in time, e.g., as a service to a customer. DGR demand may be expressed for a group of part numbers. In this situation, the customer is indifferent as to which part numbers in a group satisfy the DGR demand. As described herein, it is assumed that each DGR demand is defined for a group of part numbers. Those skilled in the art will recognize that the scope of the invention applies to the situation where a group contains one or more part numbers. The DGR demands have priorities (expressed as demand classes) which compete for material and capacity assets with the priorities (demand classes) of regular (non-DGR, non-service) demands. "Service demand" includes a planned inventory consumption maintained based on an understanding of the customer needs. As an example, if a customer wants assembly service for all the parts the supplier can ship based on supply against the DGR reserve demand, the supplier user can manually input an arbitrarily large service demand due immediately. As used herein, "production facility" can be any type of enterprise that produces a physical or virtual inventory of goods and/or services.

There is no implied relationship required between the respective priorities of these complementary demands. Supplying a DGR demand on time may be critically important (e.g., due to a contractual obligation) while providing the assembly service which consumes the DGR supply may be less important (e.g., if the customer has the option of a third-party assembler providing the service). Typically, the DGR demands would be expressed at one level of the bills of materials (e.g., finished wafer) while service demand would be expressed at another level of the bills of material (e.g., finished assembly/module). The parts subject to these complementary demand relationships can compete for capacity with parts subject to a more traditional business relationship. During this competition, upstream in the supply chain, the DGR demand portion of the bills of material supply chain (e.g. parts C, D, and E in FIG. 2), capacity should be allocated based on the DGR demands' priorities and independently of the service demand priorities. Further, downstream the supply chain, capacity should be allocated based on the service demand priorities and independently of the DGR demand priorities. This may be desirable even if capacities (e.g., test capacity) are consumed above and below the DGR demand level of the supply chain. A further consideration is that DGR demands are not necessarily expressed by part number. There may be a group of part numbers, e.g., due to different revision levels, whose availability will fulfill the DGR demand requirements.

Figure 2:
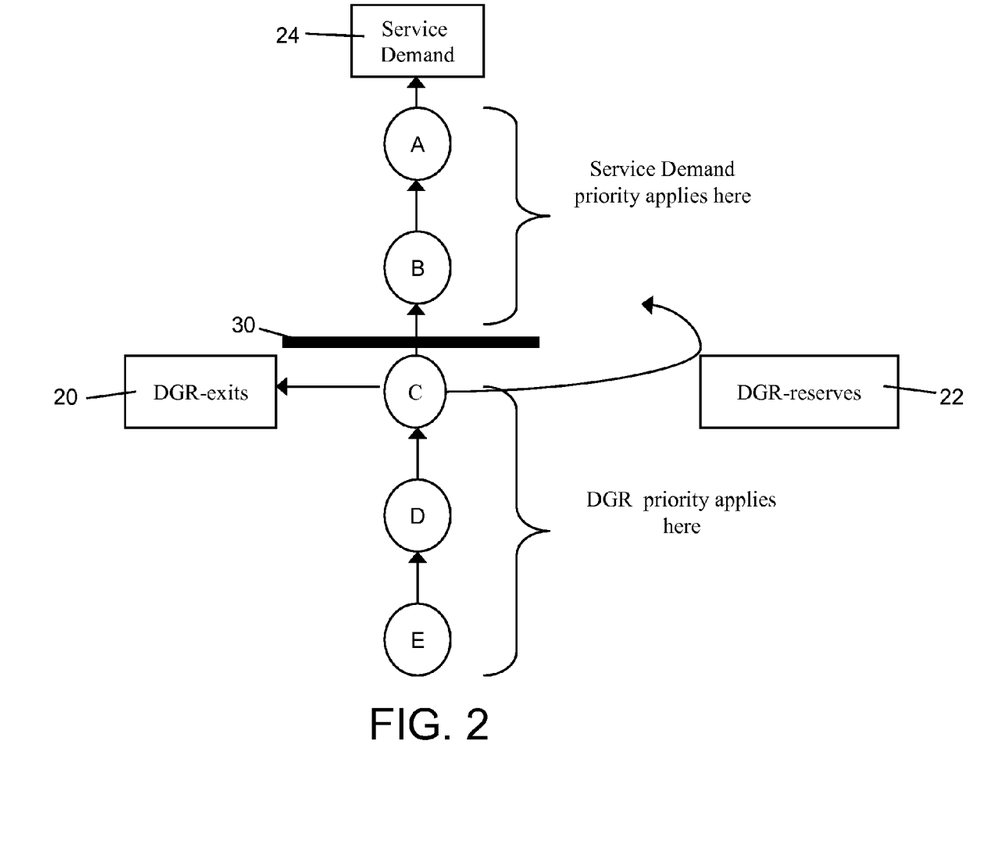
FIG. 2 shows an illustrative serial bill of materials supply chain with daily going rate (DGR) exit and reserve demand.

Referring to FIG. 2, the concepts of complementary demands are further illustrated. FIG. 2 shows a simple serial bills of material supply chain where parts A, B, C and D are made from parts B, C, D and E, respectively. In this illustration, DGR demands 20, 22 are placed on part C. DGR exit demand (DGR-exits) 20 reflects the quantity over time of part C that the customer wants shipped to it directly. DGR reserve demand (DGR-reserves) 22 reflects the quantity over time of part C that the customer wants available and reserved for use in satisfying the Service Demand 24 the customer places on part A, which in turn requires part B which in turn requires part C. The solid line 30 between parts B and C indicates that parts C, D, and E are planned based on the DGR demands 20 and 22 independently of any dependent demand that part B would place on part C as a result of the service demand 24. Parts C, D, and E are planned based on the priorities of the DGR demands while parts A and B are planned based on the priorities of the service demand 24.

II. System Overview

Figure 3:
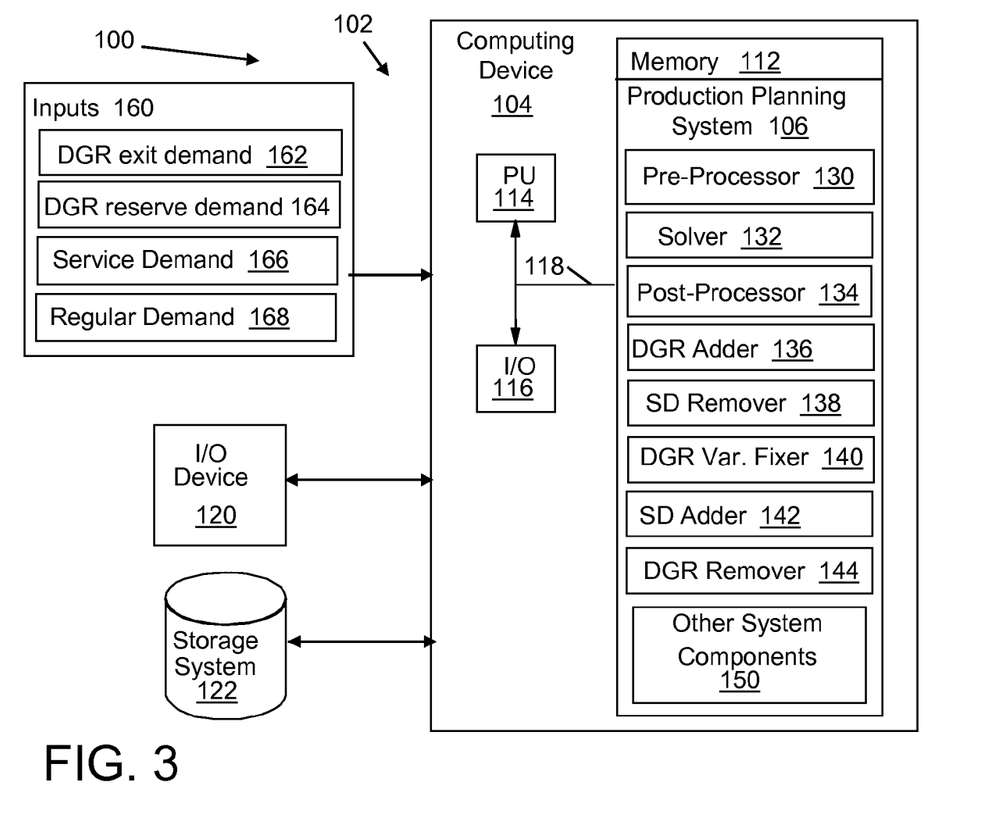
FIG. 3 shows a block diagram of a planning production system according to one embodiment of the invention.

Turning to the drawings, FIG. 3 shows an illustrative environment 100 for planning production for complementary demands. To this extent, environment 100 includes a computer infrastructure 102 that can perform the process described herein for planning production for complementary demands. In particular, computer infrastructure 102 is shown including a computing device 104 that comprises a production planning system 106, which enables computing device 104 to plan production for complementary demands by performing the process of the invention.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as production planning system 106, which is stored in memory 112 and/or storage system 122. While executing computer program code, processor 114 can read and/or write data, such as production planning data, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices.

In any event, computing device 104 can comprise any general purpose computing article of manufacture capable of executing computer program code installed thereon (e.g., a personal computer, server, handheld device, etc.). However, it is understood that computing device 104 and production planning system 106 are only representative of various possible equivalent computing devices that may perform the process of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the process of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As discussed herein, production planning system 106 enables computing infrastructure 102 to plan production for complementary demands. To this extent, production planning system 106 is shown including a pre-processor 130, a solver 132, a post-processor 134, a daily going rate (DGR) adder 136, a service demand (SD) remover 138, a DGR variable (var.) fixer 140, an SD adder 142, a DGR remover 144, and other system components 150. Operation of each of these systems is discussed further below. However, it is understood that some of the various systems shown in FIG. 3 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

III. Operational Methodology

Figure 4:
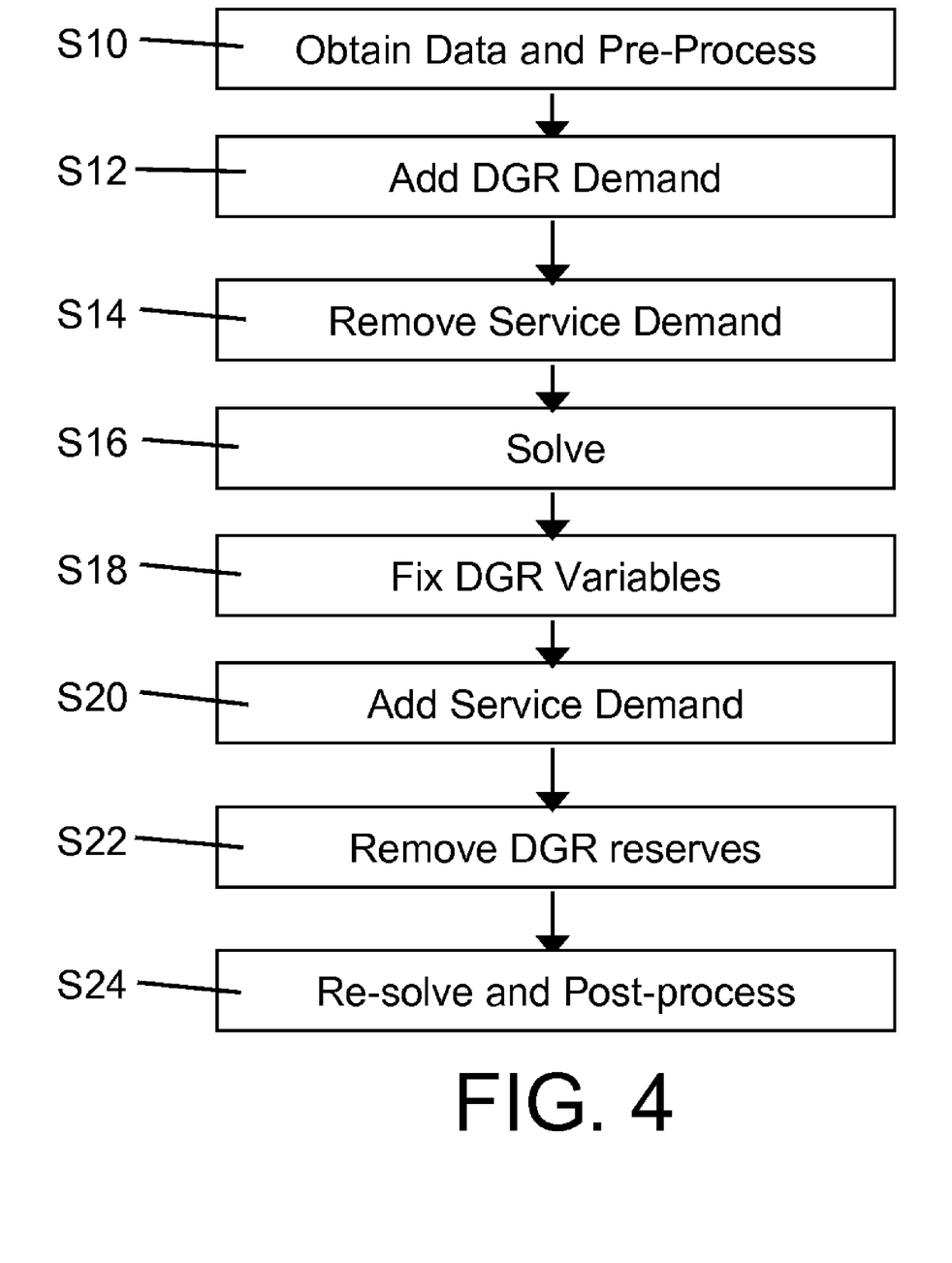
FIG. 4 shows a flow diagram of one embodiment of a method of operation of the system of FIG. 3.

Turning to FIG. 4, a flow diagram of one embodiment of a method of operation of production planning system 106 of FIG. 3 is shown. The following description refers to both figures.

At S10, data obtaining and pre-processing is performed by pre-processor 130. That is, pre-processor 130 obtains, inter alia, complementary demand values including at least one DGR demand 162, 164 and a service demand 166, and performs the typical pre-processing preparation of input data (inputs) 160 for solver 132. For example, inputs 160 may include 'regular demand' 168 such as committed customer orders, uncommitted customer orders, delivery schedules, forecasts, and buffers; DGR demand including DGR exit demand 162, DGR reserve demand 164; and/or service demand 166. Configuration may include any now known or later developed manipulation for solver 132.

At S12, DGR adder 136 adds to solver 132 input DGR demand 162, 164, e.g., DGR variables and equations required to support DGR demand relationships. These additions are defined as follows, based in part on the parameters described in the above related art section:

Define the following constants:

$DGRX_{jgkq}$: amount of DGR exit demand 162 requested during time period j for part numbers in group g at customer location k for demand class q.

$DGRR_{jgkq}$: the amount of DGR reserve demand 164 requested during time period j for part numbers in group g at customer location k for demand class q.

Define the following "DGR variables":

$V_{jmgkq}$: the amount of group g DGR exit demand 162 allocated to part number m during time period j at customer location k for demand class q.

$W_{jmgkq}$: the amount of group g DGR reserve demand 164 allocated to part number m during time period j at customer location k for demand class q.

Note, that the above-defined DGR variables are in contrast to "DGR related variables," which may include, for example, as defined above: production starts P; quantity of substitutions L; and internal shipments T.

Modify the backorder conservation equation to:

$$B_{jmkq} = B_{(j-1)mkq} + \left(\sum_{g\ s.t.m \in g}(V_{jmgkq} + W_{jmgkq})\right) + DEMAND_{jmkq} - \sum_{a} F_{jmakq}$$

Furthermore, add the below constraints so that the V and W DGR variables sum to the total DGR exit demand 162 and DGR reserve demand 164 as follows:

$$\sum_{m \in g} V_{jmgkq} = DGRX_{jgkq}$$

$$\sum_{m \in g} W_{jmgkq} = DGRR_{jgkq}$$

Observe that the incorporation of the $V_{jmgkq}$ and $W_{jmgkq}$ DGR variables into the above backorder conservation equation means that no change is required to the objective function. The regular backorder penalties on the $B_{jmkq}$ variables will result in the desired solution without the need for any objective coefficients on the $V_{jmgkq}$ and $W_{jmgkq}$ DGR variables. Together, the above revised and new constraints have the effect of allowing solver 132 to allocate DGR demands 162, 164 across the individual part numbers in the group based on the demand class [priority] and other factors reflected in the background art.

At S14, service demand (SD) remover 138 removes (excludes) the service demand 166 from input to solver 132. That is, service demand 166 will not be considered in the first solver 132 run (S16). There are a number of different ways in which service demand 166 may be distinguishable from regular demand 168. In one embodiment, a field (a flag) in the demand record indicates whether the demand is service demand 166 or regular demand 168. All of regular demand 168 is considered in both solver 132 runs (S16 and S24) in FIG. 4, while service demand 166 is considered only in the second solver 132 run (S24) and DGR demands 162, 164 are considered only in the first solver 132 run (S16). In one embodiment, DGR demands 162, 164 are provided in a file separate from the file containing the regular demand 168 and service demand 166, and a field (a flag) in the DGR demand file indicates whether the record is for DGR exit demand 162 or DGR reserve demand 164. An additional file defines the part numbers which are a member of each group. Alternative file structure embodiments will be obvious to those skilled in the art.

At S16, solver 132 runs a first planning production model in which DGR variables V and W corresponding to DGR demand 162, 164 are included and service demand 166 is excluded. More specifically, the first planning production model includes the DGR variables, e.g., V and W, as defined above, and one or more DGR group constraints, as described above. Solver 132 solves the programming model using any now known or later developed methodologies. In one embodiment, solver 132 may solve a linear programming (LP) methodology similar to that described in the related art. Those skilled in the art will recognize, however, that any advanced planning and scheduling (APS) method could be used as solver 132, including a heuristic based APS.

At S18, DGR variable (var.) fixer 140 fixes one or more DGR related variables (e.g., production starts P, quantity of substitutions L, and internal shipments T) based on their values as determined by the first solver 132 run (S16). In this case, any DGR related variables which can result in an increase in inventory at a part/plant for all parts which are a member of a DGR group may be fixed during the second planning production run (S24). This means fixing all values of production ($P_{jmae}$) and internal shipments ($T_{jmav}$) for parts in a DGR group and all values of substitutions that can increase the inventory of those parts ($L_{jmna}$ where part number n is a member of a DGR group). Note, that an increase in the inventory may extend to the case where the DGR related variables have a value of zero determined by the first solver and thus are fixed to zero for the second solver. In one embodiment, the allocated DGR exit demand 162 ($V_{jmgkq}$) may also be fixed so that the DGR exit demand 162 does not compete with service demand 166 for capacity and material assets. However, alternative embodiments may leave DGR exit demand 162 allocated (e.g., value of V variables) unfixed and thus competing with service demand 166. To avoid minute computational errors, the reference to fixing a DGR related variable's value to that obtained from a previous run may be implemented (in some embodiments) by adding lower and upper bounds to the second solver 132 run (S24) for those DGR related variables as follows: lower bound=maximum {zero, previous run result−ϵ}; and upper bound=previous run result+ϵ, where ϵ is a small number (e.g., 0.0001).

At S20, service demand (SD) adder 142 adds service demand 166 into the input for the second solver 132 run (S24). At S22, DGR remover 144 removes DGR reserve demand 164 from the model by removing all W variables from the backorder conservation equation and by removing the below equation:

$$\sum_{m \in g} W_{jmgkq} = DGRR_{jgkq}$$

Accordingly, the running of the second planning production model by solver 132 (S24) includes removing DGR reserve demand 164 in the case that DGR reserve demand 164 is included in the DGR demand.

At S24, solver 132 runs a second planning production model in which, as described above, DGR related variables (e.g., P, L, T), and perhaps DGR exit demand allocated (e.g., V), are fixed to values determined in the first planning production model (S16) and service demand 166 is included. Solver 132 re-solves the (revised) programming model by warm starting with the solution to the initial program solved at S16. As stated above, solver 132 may use a linear programming (LP) methodology similar to that described in the related art, or any APS method could be used as solver 132 including a heuristic based APS.

The above-described methodology is sufficient in many situations for determining a production plan for complementary demands. However, for large scale problems, it may be necessary to partition the production planning problem into pieces before solving it such as using the method described in U.S. Pat. No. 6,701,201, which is hereby incorporated by reference. For example, FIG. 6 of U.S. Pat. No. 6,701,201 illustrates how parts partitioned into card, module, and device directories may be solved by exploding end-item demands from the card partition through the module partition and eventually to the device partition before imploding in the reverse direction from the device partition through the module partition and back to the card partition. For example, suppose that finished modules X and Y (at level 7 of FIG. 5 of U.S. Pat. No. 6,701,201) have service demand 166 and that an untested device (at level 3 of FIG. 5 of U.S. Pat. No. 6,701, 201) has DGR demand 162, 164. Further suppose that module levels 5-7 are solved in the module partition (e.g., stage 620 of FIG. 6 of U.S. Pat. No. 6,701,201) and that device levels 1-4 are solved in the device partition (e.g., stage 610 of FIG. 6 of U.S. Pat. No. 6,701,201). Following the explosion process of the module partition, service demand 166 at level 7 must be pegged to the underlying level 5 modules supporting them. That is, the method must calculate which level 5 module releases (by part number, plant, process, and quantity) are being used to satisfy service demand 166 at level 7. This may be accomplished using a method such as described in U.S. Patent Application Publication Number US20050177465A1, which is hereby incorporated by reference, to peg the attribute which indicates the finished module demand is a service demand 166 to the module manufacturing starts at the bottom of the module partition. This service demand attribute (e.g., a flag indicating whether the quantity is being used to satisfy service demand or not) is passed along during the "one level explosion" (reference 1005 of FIG. 10 of U.S. Pat. No. 6,701, 201) of module releases at level 5 to create dependent device demand at level 4. As a result, the level 4 device demand is thus identified as to whether its purpose is for a service demand or not. With that information, the device partition is subsequently processed with the operational method of FIG. 3 according to one embodiment of the invention, as described above, ignoring service demand 166 when the first solver 132 run (S16) occurs and considering service demand 166 when the second solver 132 run (S24) occurs. During the implosion process of U.S. Pat. No. 6,701,201 (from level 4 devices to level 5 modules), the level 5 module releases supporting service demand 166 are considered and treated as if supporting regular demand 168.

IV. Conclusion

As discussed herein, various systems and components are described as "obtaining" data (e.g., DGR demand, service demand, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for planning production for complementary demands, it is understood that the invention further provides various alternative embodiments. For example, in one embodiment, the invention provides a program product stored on a computer-readable medium, which when executed, enables a computer infrastructure to plan production for complementary demands. To this extent, the computer-readable storage medium includes program code, such as production planning system 106 (FIG. 3), which implements the process described herein. It is understood that the term "computer-readable storage medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 3) and/or storage system 122 (FIG. 3) (e.g., a fixed disk, a read-only memory, a random access memory, a cache memory, etc.), as a data signal traveling over a network (e.g., during a wired/wireless electronic distribution of the program product), on paper (e.g., capable of being scanned in as electronic data), and/or the like.

In another embodiment, the invention provides a method of generating a system for planning production for complementary demands. In this case, a computer infrastructure, such as computing device 104 (FIG. 3), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 3), from a computer-readable medium; (2) adding one or more computing devices to the computer infrastructure; and (3) incorporating and/or modifying one or more existing systems of the computer infrastructure, to enable the computer infrastructure to perform the process of the invention.

In still another embodiment, the invention provides a business method that performs the process described herein on a subscription, advertising, and/or fee basis. That is, a service provider, such as an application service provider, could offer to plan production for complementary demands as described herein. In this case, the service provider can manage (e.g., create, maintain, support, etc.) a computer infrastructure, such as computing device 104 (FIG. 3), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method comprising:
 using at least one computing device to obtain production demand values for semiconductor devices by performing actions, including:
 obtaining a daily going rate (DGR) demand for semiconductor devices that must be available to a customer at a predetermined time,
 wherein the DGR demand includes:
 a daily going rate (DGR) exit demand including a first portion of the available semiconductor devices that must be available to the customer at the predetermined time; and a daily going rate (DGR) reserve demand including a second portion of the available semiconductor devices that must be available to the customer at the predetermined time, the second portion of the available semiconductor devices reserved for the customer at the predetermined time;

obtaining a historic service demand including a customer planned inventory consumption based on a customer need determined prior to the predetermined time, wherein the customer planned inventory consumption is determined independent of the DGR demand;

generating a first planning production model based upon the DGR exit demand and the DGR reserve demand, exclusive of the service demand;

determining an initial production plan for fulfilling the DGR demand based upon the first planning production model;

generating a second planning production model based upon the DGR exit demand and the historic service demand; and determining a final production plan based upon the second planning production model and the initial production plan, wherein each planning production model generation includes implementing a linear programming model.

2. The method of claim 1, wherein the first planning production model includes DGR values corresponding to the DGR demand.

3. The method of claim 1, further comprising:
determining DGR exit demand values based upon the generating of the first planning production model; and
fixing the DGR exit demand values to be included in the generating of the second planning production model.

4. The method of claim 1, wherein the generating of the second planning production model uses the initial production plan as a warm start.

5. The method of claim 1, wherein the DGR exit demand values provide for an increase in inventory during the generating of the first planning production.

6. A system comprising:
a computer system including at least one computing device for planning production of semiconductor devices, the computer system including:
a pre-processor system for obtaining production demand values for semiconductor devices by performing actions including:
obtaining daily going rate (DGR) demand for semiconductor devices that must be available to a customer at a predetermined time,
wherein the DGR demand includes:
a daily going rate (DGR) exit demand including a first portion of the available semiconductor devices that must be available to the customer at the predetermined time; and
a daily going rate (DGR) reserve demand including a second portion of the available semiconductor devices that must be available to the customer at the predetermined time, the second portion of the available semiconductor devices reserved for the customer at the predetermined time;

obtaining a historic service demand including a customer planned inventory consumption based on a customer need determined prior to the predetermined time, wherein the customer planned inventory consumption is determined independent of the DGR demand; and a solver system for:
generating a first planning production model based upon the DGR exit demand and the DGR reserve demand, exclusive of the service demand;
determining an initial production plan for fulfilling the DGR demand based upon the first planning production model;
generating a second planning production model based upon the DGR exit demand and the historic service demand; and
determining a final production plan based upon the second planning production model and the initial production plan,
wherein each planning production model generation includes implementing a linear programming model.

7. The system of claim 6, further comprising a system for:
determining DGR exit demand values based upon the generating of the first planning production model; and
fixing the DGR exit demand values to be included in the generating of the second planning production model.

8. The system of claim 6, wherein the generating of the second planning production model uses the initial production plan as a warm start.

9. The system of claim 6, wherein the DGR exit demand values provides for an increase in inventory during the generating of the first planning production.

10. A program product stored on a non-transitory computer-readable medium for planning productions of semiconductor devices, the computer readable medium comprising program code for causing the computer system to:
obtain production demand values for the semiconductor devices by performing actions, including:
obtaining a daily going rate (DGR) demand for semiconductor devices that must be available to a customer at a predetermined time,
wherein the DGR demand includes:
a daily going rate (DGR) exit demand including a first portion of the available semiconductor devices that must be available to the customer at the predetermined time; and
a daily going rate (DGR) reserve demand including a second portion of the available semiconductor devices that must be available to the customer at the predetermined time, the second portion of the available semiconductor devices reserved for the customer at the predetermined time;

obtaining a historic service demand including a customer planned inventory consumption based on a customer need determined prior to the predetermined time, wherein the customer planned inventory consumption is determined independent of the DGR demand;

generate a first planning production model based upon the DGR exit demand and the DGR reserve demand, exclusive of the service demand;

determine an initial production plan for fulfilling the DGR demand based upon the first planning production model;
generate a second planning production model based upon the DGR exit demand and the historic service demand; and
determine a final production plan based upon the second planning production model and the initial production plan,
wherein each planning production model generation includes implementing a linear programming model.

11. The program product of claim 10, further comprises program code for causing the computer system to:
determine DGR exit demand values based upon the generation of the first planning production model; and
fix the DGR exit demand values to be included in the generation of the second planning production model.

* * * * *